United States Patent [19]

Balczun

[11] Patent Number: 4,498,679
[45] Date of Patent: Feb. 12, 1985

[54] GREASE SEAL

[75] Inventor: Paul J. Balczun, Erie, Pa.

[73] Assignee: Lord Corporation, Erie, Pa.

[21] Appl. No.: 571,234

[22] Filed: Jan. 16, 1984

[51] Int. Cl.³ .................. F16J 15/32; B62D 55/20
[52] U.S. Cl. ............................................ 277/92; 305/11
[58] Field of Search .................... 277/81 R, 83, 92; 305/11

[56] References Cited

U.S. PATENT DOCUMENTS

| 2,816,784 | 12/1957 | Stucke | 288/2 |
|---|---|---|---|
| 3,560,059 | 2/1971 | Miyake | 277/92 |
| 3,963,248 | 6/1976 | Rainard | 277/92 |
| 3,975,028 | 8/1976 | Satsumabayashi | 305/11 |
| 4,007,972 | 2/1977 | Baylor | 305/11 |
| 4,106,781 | 8/1978 | Benjamin et al. | 277/82 |
| 4,126,317 | 11/1978 | Bainard | 277/9.5 |
| 4,141,562 | 2/1979 | Wu | 277/1 |
| 4,166,628 | 9/1979 | Blaydon | 277/152 |
| 4,210,339 | 7/1980 | Povejsil | 305/11 |
| 4,258,927 | 3/1981 | Cather | 277/152 |
| 4,311,346 | 1/1982 | Danner | 305/11 |
| 4,392,657 | 7/1983 | Roley | 305/11 |
| 4,428,588 | 1/1984 | Oelke | 277/83 |

FOREIGN PATENT DOCUMENTS 1258972 3/1961 France .

Primary Examiner—Robert I. Smith
Attorney, Agent, or Firm—Joseph H. Heard

[57] ABSTRACT

The seal includes a substantially rigid annular base member and a generally C-shaped unitary body of elastomeric material having an inner section overlying and bonded to the outer surface of the base section, a pivot section extending outwardly from the outer surface of one end portion of the base section, and an outer section mounted by the pivot section for movement toward and away from the other end portion of the base section. During use of the seal its connector section and part of its outer section are under bending stress, and engaged portions of the outer and inner sections are both under compression stress. The outer section is biased outwardly toward the periphery of the bore of a grease-containing housing by the combined tendency of each of the foregoing body sections to return an unstressed condition. A segment of the inner section of the elastomer body projects beyond one end of the base member and, during use of the seal, has radially bulging portions in lateral engagement with the compressed portion of upper body section and with the aforesaid end of the base member.

4 Claims, 2 Drawing Figures

GREASE SEAL

FIELD OF THE INVENTION

This invention relates to purgable grease seals employable in trunnion or similar assemblies that include a grease housing having a bore into which projects an end portion of a smaller diameter spindle component of the assembly. The invention more specifically relates to an improved grease seal, usable in such an assembly, that is capable of convenient manufacture and installation and is highly reliable and durable in operation.

BACKGROUND OF THE INVENTION

One common utilization of trunnion assemblies of the foregoing type is in the leaf spring suspension systems of heavy duty trucks and similar vehicles. If expensive down-time of the vehicles with which they are associated is to be avoided, such trunnion assemblies and the grease seals employed therein must function reliably and satisfactorily for long periods of time notwithstanding their exposure to extreme temperatures, dirt and other debris, and other adverse operating conditions. The seal employed in such an assembly, and more particularly within the annular space between the spindle component and the periphery of the bore of the housing component, must reliably perform multiple and somewhat inconsistent functions. During recharging of the grease housing, the seal should permit purging discharge of old grease from the housing as new grease is pumped under pressure into it. At all other times during use of the trunnion, the seal should prevent passage of the grease from the housing. Additionally, it should prevent passage of dirt and other debris into the housing. The seal should further be of economical manufacture, and capable of convenient installation both initially and on occasions when the same might be removed for purposes of inspection and/or replacement.

DESCRIPTION OF THE PRIOR ART

One known type of purgable grease seal for use in trunnion assemblies and the like consists of a plastic or stiff rubber body having an outer portion biased outwardly into engagement with the periphery of the grease chamber bore by an underlying annular coil metal spring. The seal is expensive and does not reliably perform its sealing function following recharging of the grease housing.

Other grease-purgable seals are disclosed in U.S. Pat. Nos. 4,106,781 and 4,166,628. Such seals include resilient bodies formed of elastomeric material and rely, for the biasing of sections thereof into desired positions, upon the inherent tendency of such material to return from a stressed to an unstressed condition. However, the stresses generating the biasing forces are primarily if not exclusively bending ones, and are present within only a relatively small amount of the elastomeric material of the seals.

SUMMARY OF THE INVENTION

The grease-purgable seal of the present invention includes a unitary body of resilient elastomeric material, which body has a plurality of discreet but integral sections which are all under stress during use of the seal and which all contribute significantly to the biasing of one of such sections toward a desired use position by reason of the combined tendency of each section to return from a stressed condition to an unstressed condition.

In a preferred embodiment thereof the elastomer body of the seal is of generally C-shaped configuration and includes an inner section which overlies and is bonded to a substantially rigid mounting member that encircles the housing-enclosed end portion of the spindle component of the trunnion assembly with which the seal is associated. A bendable pivot section of the body extends outwardly from the inner body section adjacent one end portion thereof. The body further includes an outer section, having an exterior surface adapted to be biased into engagement with the periphery of the bore of the trunnion housing, that is mounted by the pivot section for pivotal movement into engagement with the other end portion of the inner section of the elastomeric body. During use of the seal each of the aforesaid sections of the body is in a stressed condition. The pivot section and a portion of the outer section are stressed in bending. Another portion of the outer section and the thereby compressively engaged portion of the inner section are under compressive stress. The tendency of each of the sections to return from a stressed to an unstressed condition contributes to the biasing of the outer section toward the periphery of the bore of the trunnion housing, and thus to the seal's effectiveness in preventing grease egress (except during recharging) and debris ingress.

The elastomeric body of the seal may and preferably does further include a segment projecting from the other end portion of its inner section beyond an end face of the base member. The segment is compressed during use of the seal and then possesses radially outwardly and radially inwardly bulging portions which respectively laterally engage the outer section of the elastomeric body and an end face of the base member. Such engagement prevents escape of grease which might pass through the annular interface between the base member and the spindle portion which it encircles, notwithstanding the relatively close fitting relationship therebetween.

DESCRIPTION OF THE DRAWINGS

Other features of the invention will be apparent from the following description of an illustrative embodiment thereof, which should be read in conjunction with the accompanying drawing, in which.

DESCRIPTION OF THE PREFERRED EMBODIMENT

Figures 1, 2:
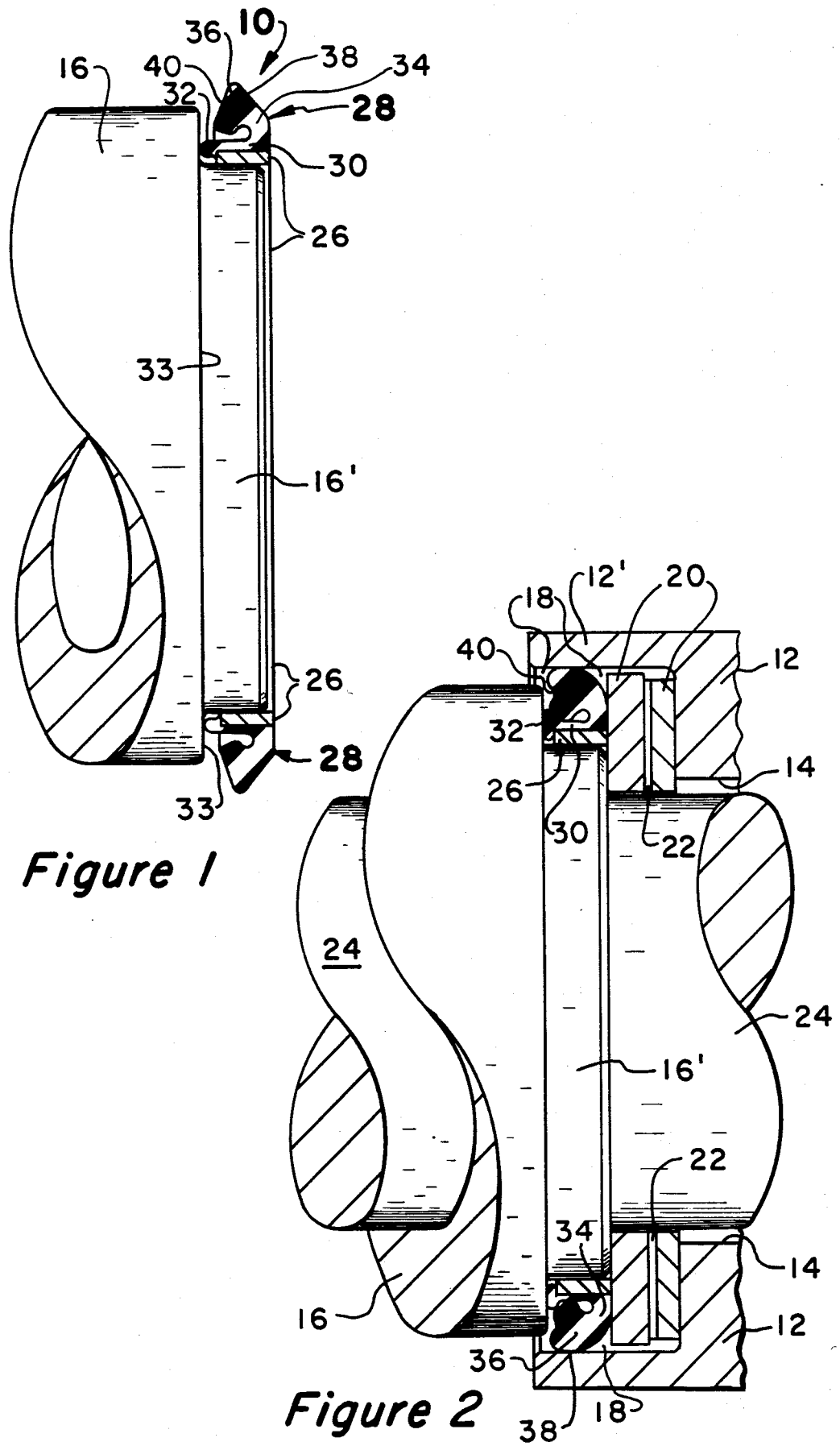
FIG. 1 is a cross-sectional view of a grease purgable seal in accordance with the invention, and of an end portion of the spindle component of a trunnion assembly, the seal being shown in an unstressed condition.
FIG. 2 is a cross-sectional view of the seal in a stressed condition of use in association with the spindle and other fragmentarily shown components of the trunnion assembly.

Referring more particularly to the drawings, the numeral 10 designates a grease-purgable seal for a conventional trunnion assembly, some components of which are fragmentarily shown. The trunnion assembly components include a grease housing 12 having a central bore 14 opening from the illustrated housing end portion 12' and there being of enlarged diameter; an annular spindle component 16 having a reduced diameter end portion 16' concentrically disposed within housing end portion 12' and defining therewith an annular space 18; a pair of thrust washers 20, one of which has a plurality of grease-conducting grooves 22 extending radially thereof, which are also disposed within housing end portion 12'; and an elongate trunnion axle or shaft 24 extending through the central bores of all of the aforesaid other trunnion components. The function of seal 10 is to permit expulsion of old grease from housing 12 through space 18 at those times when new grease is introduced into the housing under pressure via a suitable fitting (not shown) associated therewith, and to at all other times prevent grease from escaping from the housing and dirt or other debris from entering the same via annular space 18.

FIG. 1 shows seal 10 in an unstressed condition. The seal includes an annular base member 26 formed of substantially rigid plastic material such as nylon, and a unitary resilient body 28 formed entirely of durable elastomeric material such as nitrile rubber. Base member 26 is adapted to closely encircle reduced diameter portion 16' of spindle 16 and has a width slightly less than the length of such spindle portion. Elastomer body 28 is of generally C-shaped cross-sectional configuration and includes a radially innermost section 30 overlying and bonded to the outer surface of base member 26 and having a segment 32 projecting beyond one end (the left end as viewed in FIG. 1) of the base member toward a radially extending shoulder 33 of spindle 16; a bendingly pivotable connector section 34 extending outwardly from the upper surface of the right (as viewed in the drawings) end portion of inner section 30; and an outer section 36 which is mounted by connector section 34 for pivotal movement toward and away from the underlying other (leftward as viewed in the drawings) end portion of inner section 30.

Installation of seal 10 is readily effected by first placing base member 26 of seal 10 upon portion 16' of spindle 16, as shown in FIG. 1, and then bringing grease housing 12 and spindle 16 into their fully mated relationship of use shown in FIG. 2. The latter step places all sections of the previously unstressed elastomer body 28 in a stressed condition. More specifically in the foregoing regard, engagement between the right end of seal base member 26 and the adjacent trunnion assembly washer 20 displaces the base member toward spindle shoulder 33 and thus effects longitudinal compression of the projecting segment 32 of inner body section 30. In response to such compressive force, segment 30 bulges radially outwardly and radially inwardly so as to seal the space between the left end of seal 24 and spindle shoulder 33. At the same time, engagement between the periphery of housing bore 14 and an outer surface 38 of outer body section 36 pivots such outer section inwardly into compressive engagement with the upper surface of the underlying left end portion of inner section 30, placing connector section 34 under bending stress and simultaneously placing the engaged portions of outer section 36 and inner section 33 under compression stress in a radial direction. The portion of outer section 30 defining and adjacent to a generally radially extending surface 40 thereof is also simultaneously stressed in bending by reason of the concave shape of such surface.

In the FIG. 2 stressed condition of use of seal body 28, its outer section 36 is biased toward the periphery of housing bore 14 by the combined tendency of all of the body sections to return from the aforesaid stressed condition thereof to an unstressed condition. That is, the biasing force upon outer body section 36 results collectively from the tendency of connector section 34 to return from its FIG. 2 bent condition to its FIG. 1 unbent condition, from the tendency of the compressively engaged portions of inner and outer sections 30, 36 to return from their radially compressed conditions to uncompressed conditions, and from the tendency of the bent concave surface portion of outer section 36 to return to an unbent condition. The magnitude of such biasing force is such as to insure that the outer body section 36 will during normal operation of the trunnion assembly prevent escape of grease from and entry of dirt and similar debris into housing 12, via annular space 18, while still permitting purging of old grease from the housing during recharging of the latter. During recharging of housing 12 outer section 36 of course deflects further inwardly, under the impetus of the higher pressure then present within the chamber and as permitted by further strain of all of the aforesaid body sections, to permit purging of the old grease through washer grooves 22 and annular space 18.

The radially inwardly and outwardly bulged portions of segment 32 of inner section 30 prevent the escape from housing 12 of any grease which might pass between the inner surface of seal base member 26 and spindle portion 22, notwithstanding the close-fitting relationship therebetween. Additionally, the radially-outwardly bulging portion of segment 32 laterally engages and forms a protective seat or the like during use of seal 10 for the compressed portion of its outer body section 36.

Seal 10 is capable of convenient and economical manufacture and installation, and is reliable and durable in operation. Highly efficient use is made of the elastomeric material of its body 28, all sections of which contribute directly and significantly to the biasing force upon which effective operation of the seal is dependent.

While a preferred embodiment of the invention has been shown and described, this was for purposes of illustration only, and not for purposes of limitation, the scope of the invention being in accordance with the hereinafter presented claims.

What is claimed is:

1. An annular grease-purgable seal for use in a trunnion assembly or the like including a grease housing having a bore opening from one end thereof, and a spindle having an end portion projecting into said bore and spaced radially from the periphery of said bore, comprising:
 a substantially rigid base member adapted to closely encircle said end portion of said spindle;
 a unitary annular body of resilient elastomeric material;
 said body being of generally C-shaped cross-sectional configuration and including an inner section overlying and bonded to said mounting member, a bendable pivot section extending outwardly from said inner section adjacent one end portion thereof, and an outer section engageable with said chamber bore periphery and mounted by said pivot section for pivotal movement into engagement with the other end portion of said inner section;
 said body during use of said seal being in a stressed condition wherein said outer section and said other end portion of said inner section are in said engagement with each other and are stressed in compression, and wherein said pivot section is under bending stress;

said outer section being biased outwardly toward said periphery of said chamber bore by the tendency of each of said stressed body sections to return to an unstressed condition.

2. A seal as in claim 1, wherein said inner section of said body further includes a segment projecting from said other end portion thereof beyond an end face of said base member, said segment during use of said seal being compressed and then having radially outwardly and radially inwardly bulging portions respectively in lateral engagement with said outer section of said body and with said end face of said base member.

3. A seal as in claim 2, wherein said end portion of said spindle has an outwardly extending shoulder thereon, and said segment of said inner section of said body is in compressive engagement with said spindle shoulder during use of said seal.

4. A seal as in claim 1, wherein said outer body has a generally radially extending concave surface portion and said surface portion is also under bending stress during use of said seal.

* * * * *